United States Patent
Dunwoody et al.

(10) Patent No.: US 11,554,979 B2
(45) Date of Patent: Jan. 17, 2023

(54) METHODS AND SYSTEMS FOR PROCESSING OPTICAL FIBER

(71) Applicant: CORNING INCORPORATED, Corning, NY (US)

(72) Inventors: Steven Akin Dunwoody, Castle Hayne, NC (US); Nikolaos Pantelis Kladias, Horseheads, NY (US); Robert Clark Moore, Wilmington, NC (US); Jason Roy Pace, Painted Post, NY (US); Christopher Scott Thomas, Horseheads, NY (US); Bryan William Wakefield, Lindley, NY (US); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/111,168

(22) Filed: Dec. 3, 2020

(65) Prior Publication Data

US 2021/0179477 A1    Jun. 17, 2021

Related U.S. Application Data

(60) Provisional application No. 62/950,627, filed on Dec. 19, 2019, provisional application No. 62/949,008, filed on Dec. 17, 2019.

(30) Foreign Application Priority Data

Jan. 17, 2020    (NL) ...................................... 2024696

(51) Int. Cl.
*C03B 37/027*    (2006.01)
*C03B 37/029*    (2006.01)

(52) U.S. Cl.
CPC ...... *C03B 37/02718* (2013.01); *C03B 37/029* (2013.01); *C03B 2205/50* (2013.01); *C03B 2205/55* (2013.01)

(58) Field of Classification Search
None
See application file for complete search history.

(56) References Cited

U.S. PATENT DOCUMENTS

| 5,568,728 A | 10/1996 | Sapsford | |
| 2004/0047576 A1* | 3/2004 | Kurusu | G02B 6/02 385/123 |

(Continued)

FOREIGN PATENT DOCUMENTS

| EP | 0079186 A1 | 5/1983 |
| EP | 3347314 A1 | 7/2018 |

(Continued)

OTHER PUBLICATIONS

Ojovan et al., "Viscosity of network liquids within Doremus approach", J. of Applied Physics, vol. 95, No. 7, pp. 3803-3810, Apr. 2004. (Year: 2004).*

(Continued)

*Primary Examiner* — Lisa L Herring
(74) *Attorney, Agent, or Firm* — Kevin L. Bray

(57) ABSTRACT

A system for processing optical fiber includes a draw furnace, a fiber conveyance pathway extending between an upstream end positioned at the draw furnace and a downstream end positioned opposite the upstream end, where optical fiber is conveyed along the fiber conveyance pathway from the upstream end to the downstream end in a fiber conveyance direction, a muffle in communication with the draw furnace and positioned downstream of the draw furnace, a second cooling device annularly surrounding the fiber conveyance pathway downstream from the draw furnace, the second cooling device including one or more (Continued)

second cooling device heating elements and a first cooling device positioned between the draw furnace and the second cooling device, wherein the first cooling device directs a fluid to contact the optical fiber.

16 Claims, 12 Drawing Sheets

(56) References Cited

U.S. PATENT DOCUMENTS

| | | | |
|---|---|---|---|
| 2004/0099015 A1* | 5/2004 | Leppert | C03C 25/607 65/424 |
| 2015/0040614 A1 | 2/2015 | Dunwoody et al. | |
| 2017/0297947 A1* | 10/2017 | Billings | C03B 37/02727 |
| 2018/0093912 A1* | 4/2018 | Gibson | B29C 48/11 |

FOREIGN PATENT DOCUMENTS

| | | | |
|---|---|---|---|
| JP | 2000-072469 A | 3/2000 | |
| WO | 2017/044543 A1 | 3/2017 | |
| WO | 2017/075161 A1 | 5/2017 | |

OTHER PUBLICATIONS

European Patent Application No. 20212134.9, Extended European Search Report dated Mar. 19, 2021; 7 pages; European Patent Office.

* cited by examiner

METHODS AND SYSTEMS FOR PROCESSING OPTICAL FIBER

This application claims the benefit of priority to Dutch Patent Application No. 2024696, filed on Jan. 17, 2020, which claims the benefit of priority to U.S. Provisional Application Ser. No. 62/950,627 filed on Dec. 19, 2019 and to U.S. Provisional Application Ser. No. 62/949,008 filed on Dec. 17, 2019, the content of which is relied upon and incorporated herein by reference in its entirety.

BACKGROUND

Field

The present specification generally relates to apparatuses and methods for processing optical fibers, and more particularly, to apparatuses and methods for controllably cooling an optical fiber in a draw process.

TECHNICAL BACKGROUND

Conventional manufacturing processes for producing optical fibers generally include drawing an optical fiber downward from a draw furnace and along a linear pathway through multiple stages of production in an optical fiber draw tower. Once drawn from the draw furnace, the optical fiber may be cooled in a regulated manner to achieve desired fiber properties.

To meet consumer demand for optical fiber, it is desirable to increase optical fiber production within existing optical fiber draw towers. To increase optical fiber production, the rate at which the optical fiber is drawn is generally increased. However, increased draw rates may lead to increased temperatures of the optical fiber at the various stages of production, which may lead to decreased quality of the optical fiber.

Accordingly, a need exists for improved methods and systems for controllably cooling an optical fiber in a draw process.

SUMMARY

In a first aspect A1, a method for processing optical fiber includes conveying an optical fiber through a first cooling device, the first cooling device having a first inlet and a first outlet positioned opposite the first inlet, the optical fiber entering the first cooling device at the first inlet and exiting the first cooling device at the first outlet, the optical fiber having a first temperature and a first diameter at the first inlet, and a second temperature and a second diameter at the first outlet, cooling the optical fiber at a rate greater than 10000° C./s in the first cooling device, conveying the optical fiber from the first cooling device to and through a second cooling device at a velocity greater than 40 m/s, the second cooling device having a second inlet and a second outlet, the optical fiber entering the second cooling device at the second inlet and exiting the second cooling device at the second outlet, the optical fiber having a third temperature and a third diameter at the second inlet and a fourth temperature and a fourth diameter at the second outlet, the third temperature greater than 1100° C. and the fourth diameter exceeding 95% of the third diameter, and cooling the optical fiber at a rate less than 5000° C. in the second cooling device.

In a second aspect A2, the disclosure provides the method of aspect A1, where the optical fiber is conveyed at a velocity greater than 50 m/s.

In a third aspect A3, the disclosure provides the method of either of aspects A1 or A2, further including forming a cladding around a core of the optical fiber, where the cladding comprises a refractive index that is different than the core of the optical fiber.

In a fourth aspect A4, the disclosure provides the method of any of aspects A1-A3, where the first temperature is more than 150° C. greater than a forming point temperature.

In a fifth aspect A5, the disclosure provides the method of any of aspects A1-A4, where the optical fiber has a forming point temperature Tfp), the first temperature is T1, and Tfp+150° C.<T1<Tfp+500° C.

In a sixth aspect A6, the disclosure provides the method of any of aspects A1-A5, where the second temperature is T2, the optical fiber has a forming point temperature Tfp), and Tfp−100° C.<T2.

In a seventh aspect A7, the disclosure provides the method of any of aspects A1-A6, where the second temperature is T2, the optical fiber has a forming point temperature Tfp, and Tfp−100° C.<T2<Tfp+200° C.

In an eighth aspect A8, the disclosure provides the method of any of aspects A1-A7, where the first diameter is between 102% and 150% of the fourth diameter.

In a ninth aspect A9, the disclosure provides the method of any of aspects A1-A8, where the first diameter is about 160 micrometers.

In a tenth aspect A10, the disclosure provides the method of any of aspects A1-A9, where the second diameter is between 100% and 125% of the fourth diameter.

In an eleventh aspect A11, the disclosure provides the method of any of aspects A1-A10, where the second diameter is about 131 micrometers.

In a twelfth aspect A12, the disclosure provides the method of any of aspects A1-A11, where the second diameter is between 100% and 105% of the fourth diameter.

In a thirteenth aspect A13, the disclosure provides the method of any of aspects A1-A12, where the third diameter is between 100% and 101% of the fourth diameter.

In a fourteenth aspect A14, the disclosure provides the method of any of aspects A1-A13, where the third diameter is greater than 80 micrometers.

In a fifteenth aspect A15, the disclosure provides the method of any of aspects A1-A14, where the third diameter is greater than 100 micrometers.

In a sixteenth aspect A16, the disclosure provides the method of any of aspects A1-15, where the third diameter is greater than 120 micrometers.

In a seventeenth aspect A17, the disclosure provides the method of any of aspects A1-A16, where the third diameter is in a range from 120 micrometers to 130 micrometers.

In an eighteenth aspect A18, the disclosure provides the method of any of aspects A1-A17, where the third diameter is about 126.3 micrometers.

In a nineteenth aspect A19, the disclosure provides the method of any of aspects A1-A18, where the optical fiber is cooled at a rate greater than 15000° C./s in the first cooling device.

In a twentieth aspect A20, the disclosure provides the method of any of aspects A1-A19, where the optical fiber is cooled at a rate greater than 25000° C./s in the first cooling device.

In a twenty-first aspect A21, the disclosure provides the method of any of aspect A1-A20, where the optical fiber is cooled at a rate between 20000° C./s and 45000° C./s in the first cooling device.

In a twenty-second aspect A22, the disclosure provides the method of any of aspects A1-A21, where the third temperature is greater than 1200° C.

In a twenty-third aspect A23, the disclosure provides the method of any of aspects A1-A22, where the third temperature is greater than 1300° C.

In a twenty-fourth aspect A24, the disclosure provides the method of any of aspects A1-A23, where the third temperature is greater than 1400° C.

In a twenty-fifth aspect A25, the disclosure provides the method of any of aspects A1-A24, where the fourth diameter is greater than 98% of the third diameter.

In a twenty-sixth aspect A26, the disclosure provides the method of any of aspects A1-A25, where the fourth diameter is in a range from 97% of the third diameter to 100% of the third diameter.

In a twenty-seventh aspect A27, the disclosure provides the method of any of aspects A1-A26, where the fourth diameter is in a range from 98% of the third diameter to 100% of the third diameter.

In a twenty-eighth aspect A28, the disclosure provides the method of any of aspects A1-A27, where the fourth diameter is in a range from 99% of the third diameter to 100% of the third diameter.

In a twenty-ninth aspect A29, the disclosure provides the method of any of aspects A1-A28, where the optical fiber includes a core and a cladding extending around the core, the cladding having a viscosity greater than $10^{8.2}$ Poise at the second inlet.

In a thirtieth aspect A30, the disclosure provides the method of any of aspects A1-A29, where the optical fiber comprises a core and a cladding extending around the core, the cladding having a viscosity between $10^{8.2}$ Poise and $10^{10.7}$ Poise at the second outlet.

In a thirty-first aspect A31, the disclosure provides the method of any of aspects A1-A30, where the optical fiber is cooled at a rate less than 4000° C./s in the second cooling device.

In a thirty-second aspect A32, the disclosure provides the method of any of aspects A1-A31, where the optical fiber is cooled at a rate greater than 2000° C./s in the second cooling device.

In a thirty-third aspect A33, a system for processing optical fiber includes a draw furnace, a fiber conveyance pathway extending between an upstream end positioned at the draw furnace and a downstream end positioned opposite the upstream end, where optical fiber is conveyed along the fiber conveyance pathway from the upstream end to the downstream end in a fiber conveyance direction, a muffle in communication with the draw furnace and positioned downstream of the draw furnace, a second cooling device annularly surrounding the fiber conveyance pathway downstream from the draw furnace, the second cooling device including one or more second cooling device heating elements and a first cooling device positioned between the draw furnace and the second cooling device, where the first cooling device directs a fluid to contact the optical fiber, where the first cooling device defines a span that is between 5 millimeters and 50 millimeters.

In a thirty-fourth aspect A34, the disclosure provides the system of aspect A33, where the first cooling device defines a span that between 10 millimeters and 20 millimeters.

In a thirty-fifth aspect A35, the disclosure provides the system of either of aspects A33-A34, where the first cooling device is in communication with the muffle, and the first cooling device directs the fluid to contact the optical fiber within the muffle.

In a thirty-sixth aspect A36, the disclosure provides the system of either of aspects A33-A34, further including a cooling tube positioned between the draw furnace and the second cooling device, wherein the first cooling device is in communication with the cooling tube.

In a thirty-seventh aspect A37, the disclosure provides the system of any of aspects A33-A36, where the cooling tube defines a cooling tube inlet and a cooling tube outlet positioned downstream of the cooling tube inlet, wherein the cooling tube outlet defines a tube outlet span that is less than 10 millimeters.

In a thirty-eighth aspect A38, the disclosure provides the system of any of aspects A33-A37, where the cooling tube comprises an interior region bounded by an inner wall and an annular channel defined by the inner wall and an outer wall positioned outward of the inner wall.

In a thirty-ninth aspect A39, the disclosure provides the system of any of aspects A33-A38, where the cooling tube comprises a collar surrounding a portion of the fiber conveyance pathway within the cooling tube.

In a fortieth aspect A40, the disclosure provides the system of any of aspects A33-A39, further including a turning device positioned along the fiber conveyance pathway downstream of the first cooling device, wherein the turning device changes the fiber conveyance direction.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
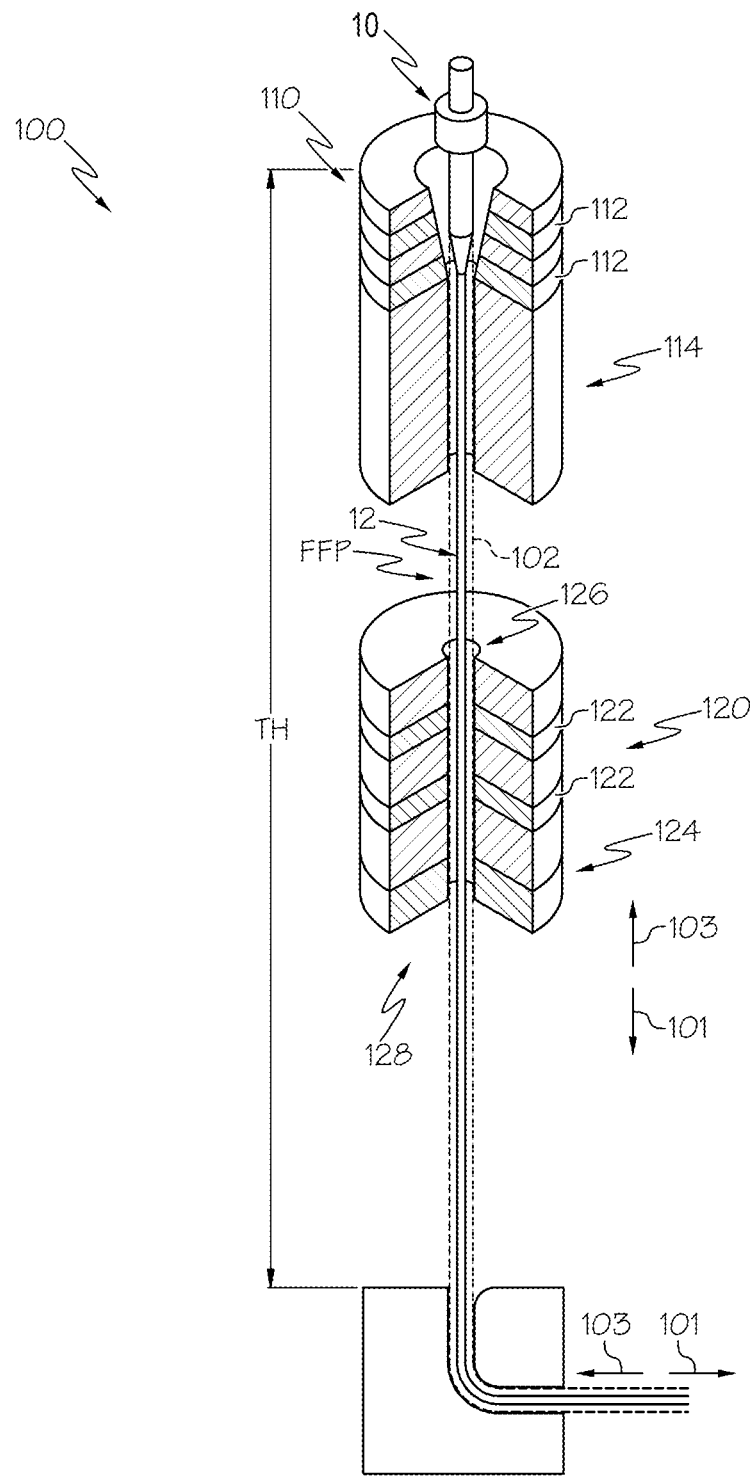
FIG. 1 schematically depicts an optical fiber production system, according to one or more embodiments described herein.

Optical fiber manufacturing processes may generally include drawing optical fiber downward from a draw furnace in an optical fiber draw tower. From the draw furnace, the optical fiber is drawn along a fiber conveyance pathway through one or more cooling devices that cool the optical fiber in a regulated manner to achieve desired fiber properties. For example, as the optical fiber controllably cools, a diameter of the optical fiber reduces to a finished diameter at a forming point. Additionally, the structure of the optical fiber changes as the optical fiber cools.

To meet consumer demand for optical fiber, it is desirable to increase the rate at which optical fiber is drawn, thereby increasing optical fiber production. However, increasing the rate at which the optical fiber is drawn reduces the time that the optical fiber resides in the one or more cooling devices that controllably cool the optical fiber. By reducing the time the optical fiber resides in the one or more cooling devices, a fictive temperature of the optical fiber may be increased and the optical fiber may exhibit higher attenuation.

Embodiments described herein are directed to systems and methods for cooling an optical fiber in an optical fiber production process. In particular, embodiments described herein are directed to optical fiber production systems including a draw furnace, a second cooling device, a turning device, and a first cooling device positioned upstream of the second cooling device. The first cooling device directs fluid against the optical fiber to cool the optical fiber before the optical fiber enters the second cooling device or the turning device. In embodiments, the fluid acts to reduce a gas boundary layer of the optical fiber to facilitate cooling of the optical fiber. In embodiments, the first cooling device also cools the optical fiber above the forming point of the optical fiber, such that the forming point may be moved upward (upstream) along the optical fiber draw tower, allowing more space along optical fiber draw tower for additional cooling below the forming point. Additional cooling of the optical fiber below the forming point can improve optical fiber attenuation.

Reference will now be made in detail to embodiments of methods and systems for producing optical fibers, examples of which are illustrated in the accompanying drawings. Whenever possible, the same reference numerals will be used throughout the drawings to refer to the same or like parts.

Referring initially to FIG. 1, an optical fiber production system 100 is schematically depicted. The optical fiber production system 100 generally includes a draw furnace 110, a muffle 114 in communication with the draw furnace 110, a second cooling device 120, and a turning device 140. In embodiments, the optical fiber production system 100 may be positioned within a draw tower having a height TH that generally corresponds to a distance between the draw furnace 110 and the turning device 140. In some embodiments, the optical fiber production system 100 may include one or more devices that further process the optical fiber downstream of the turning device 140, such as a fiber coating device and the like.

As depicted in FIG. 1, the optical fiber production system 100 generally defines a fiber conveyance pathway 102 that extends from the draw furnace 110 through the turning device 140. As described in greater detail herein, an optical fiber 12 travels along the fiber conveyance pathway 102 in a fiber conveyance direction 101. As referred to herein, the terms "downstream" and "downward" generally refer to the relative position of components of the optical fiber production system 100 in the fiber conveyance direction 101 along the fiber conveyance pathway 102. The terms "upstream" and "upward" refer to the relative position of components of the optical fiber production system 100 in a counter-conveyance direction 103 that is opposite the fiber conveyance direction 101 along the fiber conveyance pathway 102. By way of example, turning device 140 is downstream of second cooling device 120, which is downstream of draw furnace 110. Similarly, draw furnace 110 is upstream of second cooling device 120, which is upstream of turning device 140. In embodiments, the fiber conveyance pathway 102 generally extends between an upstream end at the draw furnace 110 and a downstream end positioned opposite the upstream end. Between the draw furnace 110 and the turning device 140, the fiber conveyance pathway 102 generally extends in a vertical direction in which the draw furnace 110 is positioned above the turning device 140.

As depicted in FIG. 1, an optical fiber preform 10 is placed in the draw furnace 110. The optical fiber preform 10 may be constructed of any glass or material suitable for the manufacture of optical fibers such as silica glass or the like. In some embodiments, the optical fiber preform 10 may include a homogenous composition throughout the optical fiber preform 10. In some embodiments, the optical fiber preform 10 may include regions having different compositions.

The draw furnace 110 includes one or more heating elements 112 that heat the optical fiber preform 10 such that the optical fiber 12 may be drawn from the optical fiber preform 10. In embodiments, the heating elements 112 generally include any elements suitable for generating thermal energy, for example and without limitation, induction coils or the like. A section view of the draw furnace 110 is depicted in FIG. 1, however, it should be understood that in embodiments, the draw furnace 110 may define a shape surrounding the optical fiber preform 10. In embodiments, the draw furnace 110 is oriented in the vertical direction, such that a downstream end of the draw furnace 110 is positioned below the optical fiber preform 10. The optical fiber 12 may be drawn from the optical fiber preform 10 as the optical fiber preform 10 softens due to heating by the draw furnace 110. By orienting the draw furnace 110 in the vertical direction, as the optical fiber preform 10 softens, portions of the optical fiber preform 10 may yield under their own weight to form the optical fiber 12, and the optical fiber 12 may be drawn along the fiber conveyance pathway 102. In some embodiments, the optical fiber production system 100 may include a fiber collection unit positioned at the downstream end of the fiber conveyance pathway 102, and the fiber collection unit may apply tension to the optical fiber 12 to draw the optical fiber 12 along the fiber conveyance pathway 102.

In embodiments, once the optical fiber 12 exits the draw furnace 110, the optical fiber 12 enters the muffle 114. A section view of the muffle 114 is depicted in FIG. 1, however like the draw furnace 110, it should be understood that in embodiments, the muffle 114 may define a shape surrounding the fiber conveyance pathway 102. In embodiments, the muffle 114 is in communication with the draw furnace 110 and may be coupled to the downstream end of the draw furnace 110.

In embodiments, the muffle 114 includes a gas environment that is similar to or the same as the draw furnace 110. For example, in some embodiments, an inert gas or gas mixture, such as helium gas or a helium gas mixture is utilized within the draw furnace 110. In some embodiments, other inert gases or other inert gas mixtures including and without limitation, nitrogen and/or argon, may be utilized within the draw furnace 110. The muffle 114 may include the same inert gas environment as the draw furnace 110 within the muffle 114.

Without being bound by theory, helium gas has a relatively high thermal conductivity, and may accordingly facilitate a higher rate of heat transfer from the optical fiber 12 as compared to ambient air or other gas mixtures. Accordingly, in embodiments in which the draw furnace 110 contains a gas environment including helium or a helium mixture, the same helium or helium mixture gas environment within muffle 114 may facilitate comparatively efficient cooling of the optical fiber 12 within the muffle 114.

Downstream from the muffle 114, the optical fiber 12 enters a slow cooling device, referred to herein as the second cooling device 120. A section view of the second cooling device 120 is depicted in FIG. 1, however, it should be understood that in embodiments the second cooling device 120 may define a shape that surrounds the fiber conveyance pathway 102. In the embodiment depicted in FIG. 1, the second cooling device 120 is spaced apart from the muffle 114 and the draw furnace 110 along the fiber conveyance pathway 102.

In embodiments, the second cooling device 120 extends between a second inlet 126 and a second outlet 128 positioned opposite the second inlet 126. The optical fiber 12 generally enters the second cooling device 120 at the second inlet 126 and exits the second cooling device 120 at the second outlet 128. The second cooling device 120 includes one or more second cooling device heating elements 122 that apply heat to the optical fiber 12 as it passes through the second cooling device 120. In embodiments, the one or more second cooling device heating elements 122 generally include any elements suitable for generating thermal energy, for example and without limitation, induction coils or the like. The second cooling device 120 may assist in reducing the cooling rate of the optical fiber 12 while the optical fiber 12 is in a glass transition region. Reducing the cooling rate of the optical fiber 12 in the glass transition region may generally assist in allowing the glass network of the optical fiber 12 to rearrange in a manner that reduces attenuation resulting from Rayleigh scattering when the optical fiber 12 is utilized as an optical waveguide.

In some embodiments, the optical fiber production system 100 further includes an airflow manifold 124 that provides clean air (i.e., ambient air not impacted by the fiber production process) to the second cooling device 120. The airflow manifold 124 may be positioned downstream of and may be in fluid communication with the second cooling device 120.

The turning device 140 is positioned on the fiber conveyance pathway 102 downstream of the second cooling device 120, and in embodiments, the turning device 140 changes the fiber conveyance direction 101. For example, in embodiments, the turning device 140 includes one or more fluid bearings or the like that redirects the optical fiber 12, changing the fiber conveyance direction 101. Upstream of the turning device 140, the fiber conveyance direction 101 generally extends in the vertical direction and the turning device 140 directs the optical fiber 12 in a direction that is transverse to or at an angle to the vertical direction in the embodiment depicted in FIG. 1. In the embodiments in which the turning device 140 includes one or more fluid bearings, the turning device 140 redirects the optical fiber 12 by impinging fluid (e.g., nitrogen, argon, helium, air, or the like) on the optical fiber 12.

In embodiments, the optical fiber production system 100 includes a first cooling device that assists in cooling the optical fiber 12. For example and referring to FIGS. 2 and 3, a section view of the muffle 114 is schematically depicted. In the embodiment depicted in FIGS. 2 and 3, the optical fiber production system 100 includes a first cooling device 150 defined at least in part by the muffle 114. The first cooling device 150 generally includes a pump 154 that moves a fluid 16 through the muffle 114 to cool the optical fiber 12. For example, in embodiments, the pump 154 may include a diaphragm pump, a reciprocating pump, or the like that directs the fluid 16 upstream through the muffle 114. More particularly, as shown in FIG. 3, the pump 154 moves the fluid 16 through the muffle 114 in the counter-conveyance direction 103 from a downstream portion 115 of the muffle 114 to an upstream portion 113 of the muffle 114 that is positioned upstream of the downstream portion 115. In the embodiment depicted in FIGS. 2 and 3, the upstream portion 113 generally serves as a first inlet of the first cooling device 150 through which the optical fiber 12 enters the first cooling device 150. The upstream portion 113 and the downstream portion 115 of the muffle 114 generally define a cooling region $C_r$ that extends through the muffle 114 and through which the first cooling device 150 moves the fluid 16.

In embodiments, the muffle 114 generally defines a muffle span $S_m$ evaluated within the cooling region $C_r$. In embodiments, the muffle span $S_m$ represents a distance evaluated across the muffle 114 in a direction that is transverse to the fiber conveyance pathway 102. For example, in embodiments in which the muffle 114 defines a cylindrical shape, the muffle span $S_m$ is a diameter extending across the muffle 114. In embodiments, the muffle span $S_m$ is selected to optimize the flow of the fluid 16 through the muffle 114 to cool the optical fiber 12. For example and without being bound by theory, as the muffle span $S_m$ decreases, the velocity of the fluid 16 through the muffle increases, for example as a result of the Bernoulli effect. Increased velocity of the fluid 16 through the muffle 114 may generally increase the transfer of heat from the optical fiber 12 within the muffle 114. However, it is generally desirable for the muffle span $S_m$ to be great enough to allow for a sufficient volume of fluid 16 to pass through the muffle 114 to effectively cool the optical fiber 12. Accordingly, it is desirable for the muffle span $S_m$ to be large enough to allow a sufficient volume of fluid 16 to move through the muffle, while it is also desirable for the muffle span $S_m$ to be comparatively small to thereby increase the velocity of the fluid 16 within the muffle 114. In some embodiments, the muffle span $S_m$ is about 13 millimeters. In some embodiments, the muffle span $S_m$ is between 10 millimeters and 20 millimeters, inclusive of the endpoints. In some embodiments, the muffle span $S_m$ is between 5 millimeters and 50 millimeters, inclusive of the endpoints.

The optical fiber 12 exits the muffle 114 at a muffle exit 116 of the muffle 114 that serves as a first outlet of the first cooling device 150. The muffle exit 116 defines a muffle exit span $S_{me}$, and the fiber conveyance pathway 102 extends through the muffle exit 116. In embodiments, the muffle exit span $S_{me}$ represents a distance evaluated across the muffle exit 116 in a direction that is transverse to the fiber conveyance direction 101. In some embodiments, the muffle exit 116 includes a circular shape and the muffle exit span $S_{me}$ is a diameter of the muffle exit 116. The muffle exit span $S_{me}$ may be selected to restrict the flow of fluid 16 out of the muffle exit 116, while allowing the optical fiber 12 to exit the muffle 114 through the muffle exit 116. In some embodiments, the muffle exit span $S_{me}$ is less than about 10 millimeters.

In embodiments, the first cooling device 150 receives the fluid 16 at the upstream portion 113 of the muffle 114, and the pump 154 re-introduces the fluid 16 at the downstream portion of the muffle 114, cycling the fluid through the muffle 114 in the counter-conveyance direction 103. For example, the pump 154 may apply a suction pressure at the upstream portion 113 of the muffle 114, drawing the fluid 16 into the pump 154, and may then direct the fluid 16 into the downstream portion 115 of the muffle 114, moving the fluid 16 through the muffle 114 in the counter-conveyance direction 103.

As described above, the muffle 114 is in communication with the draw furnace 110 (FIG. 1), accordingly, in embodiments, the composition of the fluid 16 may be selected to be similar to or the same as the fluid present in the draw furnace 110. For example and as noted above, in embodiments, helium or a helium gas mixture may be positioned within the draw furnace 110 (FIG. 1). In embodiments, the composition of the fluid 16 may be selected to include the same or a similar helium or helium gas mixture, such that the fluid 16 is the same as or similar to the gas environment in the draw furnace 110 (FIG. 1). By correlating the composition of the fluid 16 with the gas environment present in the draw furnace 110, fluid 16 that is not reclaimed by the pump 154 at the upstream portion 113 of the muffle 114 can move upstream through the muffle 114 and/or the draw furnace 110 (FIG. 1) without substantially affecting the operation of the draw furnace 110.

In embodiments, the first cooling device 150 further includes a heat exchanger 152. The heat exchanger 152 may cool the fluid 16 as the fluid 16 passes through the first cooling device 150. For example, in embodiments, the heat exchanger 152 may include a heat sink or the like that dissipates heat from the fluid 16 moving through the first cooling device 150. In operation, the first cooling device 150 receives comparatively hot fluid 16 at the upstream portion 113 of the muffle 114, cools the fluid 16 with the heat exchanger 152, and introduces comparatively cool fluid 16 at the downstream portion 115 of the muffle 114. By providing comparatively cool fluid 16 at the downstream portion 115 of the muffle 114, the first cooling device 150 may assist in cooling the optical fiber 12 within the cooling region $C_r$.

Figure 3:
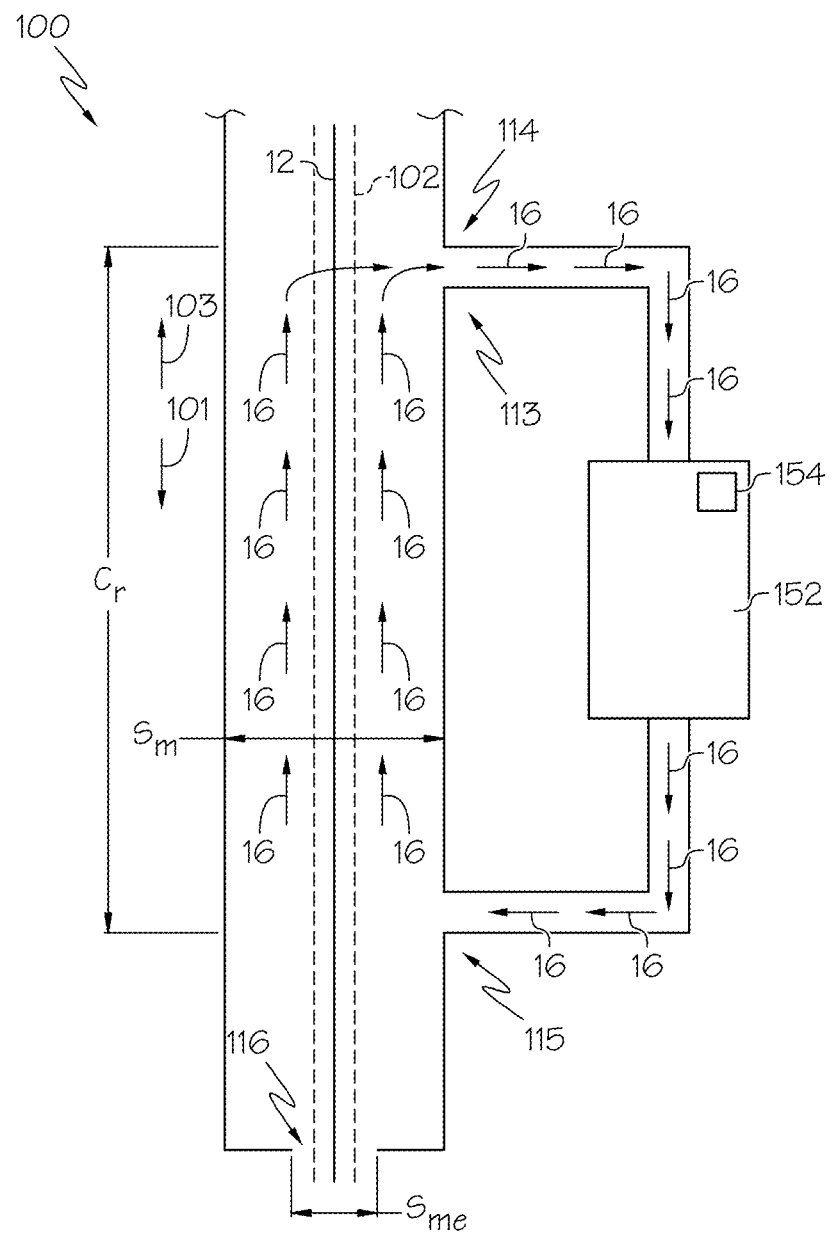
FIG. 3 schematically depicts an enlarged view of the muffle of FIG. 2, according to one or more embodiments described herein.
Figure 4:
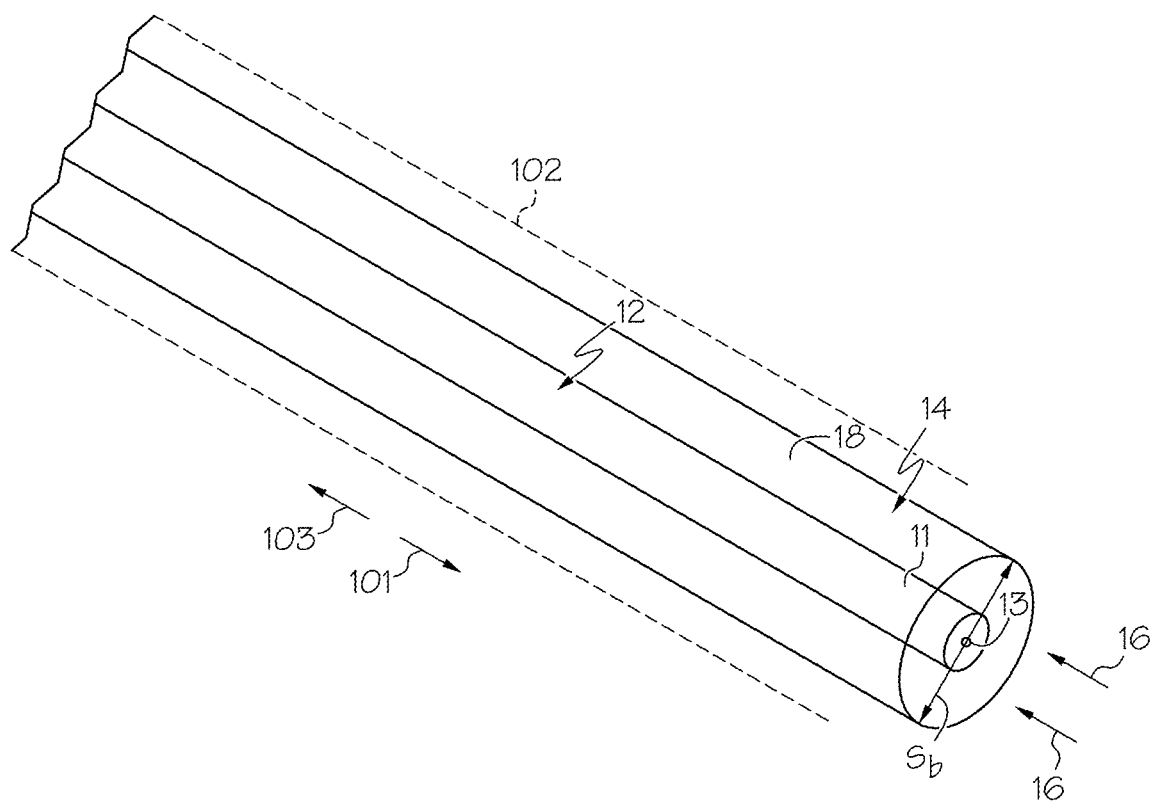
FIG. 4 schematically depicts an enlarged perspective view of an optical fiber within the optical fiber production system of FIG. 1, according to one or more embodiments described herein.

Referring to FIGS. 3 and 4, the first cooling device 150 moves the fluid 16 through the cooling tube 130 such that the fluid 16 reduces a portion of a gas boundary layer 14 surrounding the optical fiber 12. As the optical fiber 12 moves along the fiber conveyance pathway 102, the gas boundary layer 14 is generated around the optical fiber 12 and comprises gas flowing primarily in the fiber conveyance direction 101. The gas boundary layer 14 extends radially from the optical fiber 12, terminating at a gas layer interface 18 and defining a gas boundary layer span $S_b$. Without being bound by theory, the gas boundary layer 14 is formed from drag generated by motion of the optical fiber 12 in the fiber conveyance direction 101. In embodiments, the gas boundary layer 14 generally provides thermal insulation to the optical fiber 12, thereby maintaining the optical fiber 12 at a relatively high temperature.

Within the muffle 114, in some embodiments, as the fluid 16 is drawn upstream, the fluid 16 separates at least a portion of the gas boundary layer 14 from the optical fiber 12. By separating at least a portion of the gas boundary layer 14 from the optical fiber 12, the fluid 16 may assist in dissipating heat from the optical fiber 12. For example, by separating at least a portion of the gas boundary layer 14 from the optical fiber 12, the thermal insulation provided by the gas boundary layer 14 may be reduced or removed, such that thermal energy of the optical fiber 12 may be dissipated more readily as compared to optical fiber 12 including an undisturbed gas boundary layer 14.

In some embodiments, as the fluid 16 is drawn upstream, the fluid 16 compresses the gas boundary layer, reducing the gas boundary layer span $S_b$. By reducing the gas boundary layer span $S_b$, the thermal insulation provided by the gas boundary layer 14 may be reduced, such that thermal energy of the optical fiber 12 may be dissipated more readily as compared to optical fiber 12 including an undisturbed gas boundary layer 14.

Referring to FIG. 4, in embodiments, the optical fiber 12 includes a cladding 11 positioned around a core 13 of the optical fiber 12. In embodiments, the cladding 11 comprises a refractive index that is different than the core of the optical fiber. For example, in embodiments, the core 13 may have a higher refractive index than the cladding 11, and may assist in restricting light from passing out of the core 13, for example, when the optical fiber 12 is used as an optical waveguide.

Figure 5:
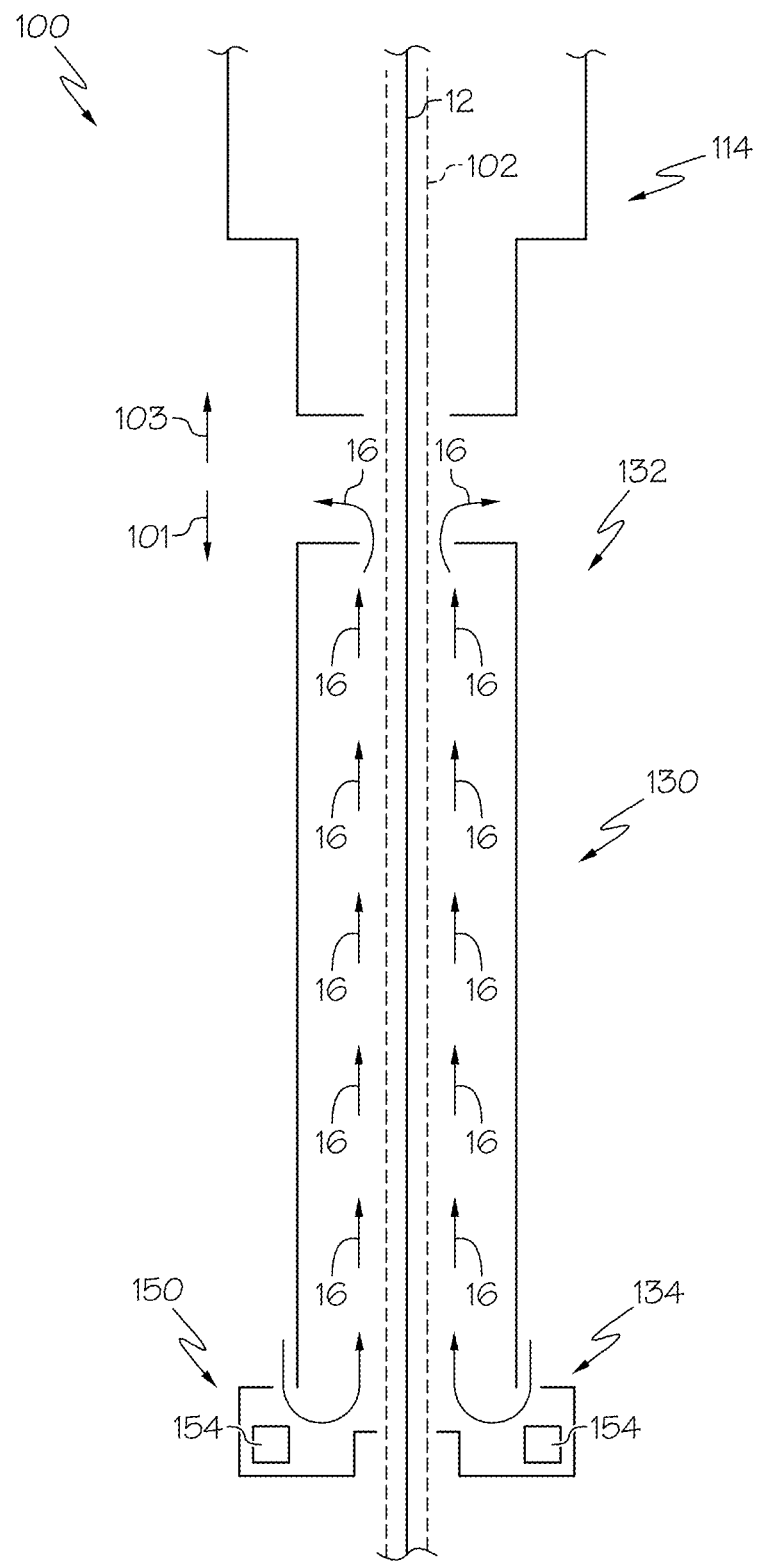
FIG. 5 schematically depicts a section view of a cooling tube positioned downstream of the muffle of FIG. 1, according to one or more embodiments shown and described herein.
Figure 6:
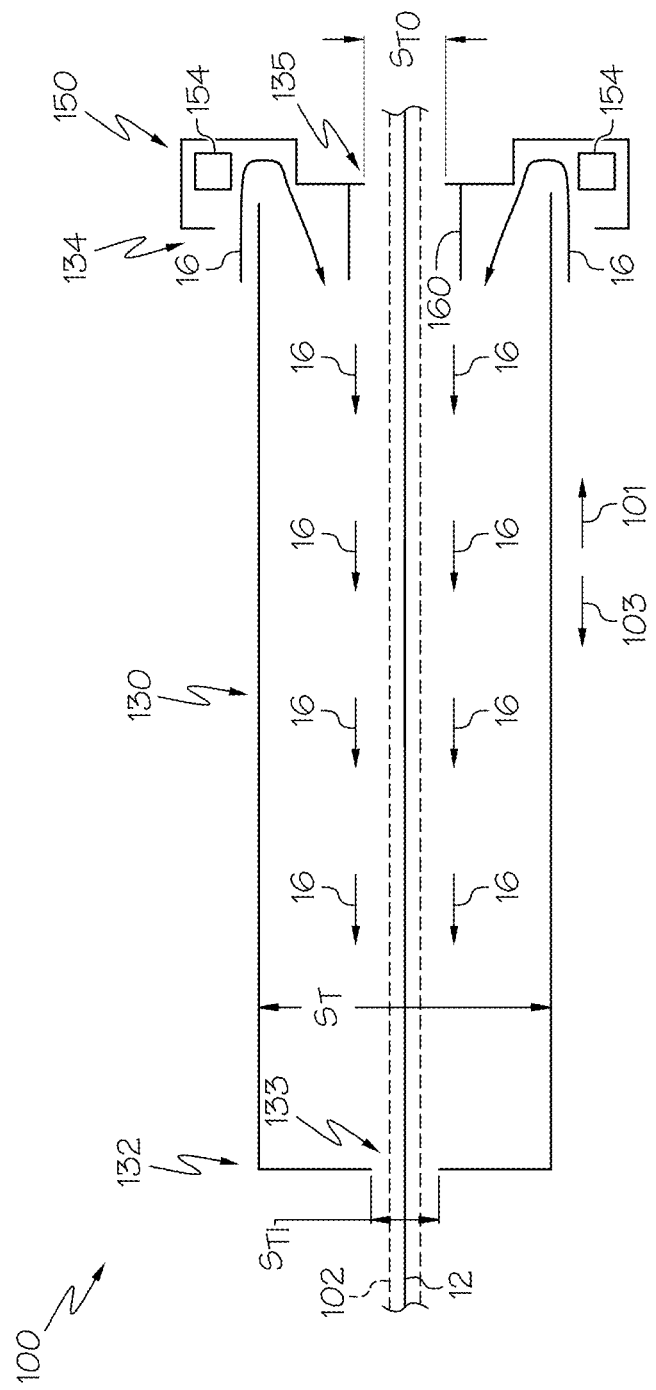
FIG. 6 schematically depicts another section view of the cooling tube of FIG. 5, according to one or more embodiments shown and described herein.

Referring to FIGS. 5 and 6, in some embodiments, the first cooling device 150 is spaced apart from the muffle 114. For example, in embodiments the first cooling device 150 comprises a cooling tube 130 that is spaced apart from the muffle 114 along the fiber conveyance pathway 102. A section view of the cooling tube 130 is depicted in FIGS. 5 and 6. However, it should be understood that in embodiments, the cooling tube 130 extends around the fiber conveyance pathway 102. The cooling tube 130 is positioned downstream from the muffle 114 on the fiber conveyance pathway 102, and extends between an upstream end 132 and a downstream end 134 that is positioned downstream of the upstream end 132.

Referring particularly to FIG. 6, in embodiments, the first cooling device 150 and moves the fluid 16 through the cooling tube 130 in the counter-conveyance direction 103, for example, via the pump 154. In some embodiments, the first cooling device 150 may draw the fluid 16 through the cooling tube 130, for example, through a vacuum or the like.

In some embodiments, the cooling tube 130 comprises a collar 160 surrounding a portion of the fiber conveyance pathway 102 within the cooling tube 130. The collar 160 is generally positioned along the fiber conveyance pathway 102 such that the collar 160 may prevent the fluid 16 from the first cooling device 150 from directly impinging the optical fiber 12. Without being bound by theory, at regions where the fluid 16 directly impinges the optical fiber 12, the fluid 16 may absorb more thermal energy as compared to regions where the fluid 16 is directed in the fiber conveyance direction 101 or the counter-conveyance direction 103. Accordingly, localized direct impingement of the fluid 16 on the optical fiber 12 may create an irregular cooling profile throughout the cooling tube 130. By positioning the collar 160 on the fiber conveyance pathway 102 such that the collar 160 prevents the fluid 16 from directly impinging on the optical fiber 12, the collar 160 may assist in creating a desired cooling profile along the cooling tube 130.

In embodiments, the cooling tube 130 defines a tube span $S_t$ evaluated across the cooling tube 130 in a direction that is transverse to the fiber conveyance direction 101. In some embodiments, the cooling tube 130 defines a cylindrical shape surrounding the fiber conveyance pathway 102, and in these embodiments, the tube span $S_t$ represents a diameter of the cooling tube 130. Similar to the muffle 114 (FIGS. 2 and 3) in the embodiment described above, the tube span $S_t$ may be selected to provide desired flow of the fluid 16 through the cooling tube 130. In some embodiments, the tube span $S_t$ is about 13 millimeters. In some embodiments, the tube span $S_t$ is between 10 millimeters and 20 millimeters, inclusive of the endpoints. In some embodiments, the tube span $S_t$ is greater than 20 millimeters. In some embodiments, the tube span $S_t$ is between 5 millimeters and 50 millimeters, inclusive of the endpoints. Similar to the muffle span $S_m$ (FIGS. 2 and 3) in the embodiment described above, the tube span $S_t$ may be selected to achieve desired flow of the fluid 16, thereby achieving desired cooling of the optical fiber 12.

In embodiments, the cooling tube 130 defines a cooling tube inlet 133 positioned at the upstream end 132 of the cooling tube 130 that serves as the first inlet of the first cooling device 150, and a cooling tube outlet 135 positioned at the downstream end 134 of the cooling tube 130 that serves as the first outlet of the first cooling device 150. The fiber conveyance pathway 102 generally extends through the cooling tube inlet 133 and the cooling tube outlet 135. The cooling tube inlet 133 defines a tube inlet span $S_{ti}$ evaluated across the cooling tube inlet 133 in a direction that is transverse to the fiber conveyance direction 101, and the cooling tube outlet 135 defines a tube outlet span $S_{to}$ evaluated in a direction that is transverse to the fiber conveyance direction 101. In some embodiments, the cooling tube inlet 133 and/or the cooling tube outlet 135 may define circular shapes, and in these embodiments, the tube inlet span $S_{ti}$ and the tube outlet span $S_{to}$ are diameters of the cooling tube inlet 133 and the cooling tube outlet 135, respectively. In some embodiments, the tube inlet span $S_{ti}$ and the tube outlet span $S_{to}$ are selected to be large enough to allow the optical fiber 12 to enter and exit the cooling tube 130, but may be selected to be small enough to assist in stripping at least a portion of the gas boundary layer 14 (FIG. 4) from the optical fiber 12. As noted above, by stripping at least a portion of the gas boundary layer 14 (FIG. 4) from the optical fiber 12, cooling of the optical fiber 12 may be enhanced. In embodiments, the tube inlet span $S_{ti}$ and/or the tube outlet span $S_{to}$ is less than about 10 millimeters.

Because the cooling tube 130 is spaced apart from the muffle 114 (FIG. 1) and the draw furnace 110 (FIG. 1), in the embodiment depicted in FIGS. 5 and 6, the composition of the fluid 16 can be selected to be different than the gas environment positioned within the draw furnace 110 (FIG. 1) and the muffle 114 (FIG. 1). For example, as noted above, in some embodiments, helium or a helium gas mixture may be utilized within the draw furnace 110 (FIG. 1) and the muffle 114 (FIG. 1). In the embodiment described above and depicted in FIGS. 2 and 3 in which the first cooling device 150 (FIG. 2) is in communication with the muffle 114 (FIG. 2), the composition of the fluid 16 (FIG. 2) is selected to correspond to the helium or helium gas mixture utilized in the draw furnace 110. As noted above, by correlating the composition of the fluid 16 with the helium or helium gas mixture within the draw furnace 110 (FIG. 2), fluid 16 not reclaimed by the first cooling device 150 can enter the draw furnace 110 without disrupting the operation of the draw furnace 110.

By contrast, by spacing the cooling tube 130 apart from the muffle 114 (FIG. 1) and the draw furnace 110 (FIG. 1), fluid 16 passed through the cooling tube 130 may be reclaimed for reuse within the cooling tube 130 or released to ambient air surrounding the optical fiber production system 100. Because the cooling tube 130 is not in communication with the muffle 114 (FIG. 1) and the draw furnace 110 (FIG. 1), fluid 16 introduced to the draw furnace 110 (FIG. 1) by the first cooling device 150 is minimized or eliminated. Because fluid 16 from the first cooling device 150 is not introduced to the draw furnace 110 (FIG. 1), the composition of the fluid 16 may be selected without consideration of the gas environment within the draw furnace 110. As such, the composition of the fluid 16 may be selected to include inert gases that are less costly than helium, such as argon, nitrogen, air, or the like. In this way, operating costs of the first cooling device 150 may be reduced by spacing the cooling tube 130 and the first cooling device 150 apart from the muffle 114 (FIG. 1) and the draw furnace 110 (FIG. 1).

Furthermore, because the cooling tube 130 is spaced apart from the draw furnace 110 (FIG. 1), first cooling device 150 may direct the fluid 16 through the cooling tube 130 at any desired flow rate. For example, because fluid 16 from the first cooling device 150 is not introduced to the draw furnace 110 (FIG. 1), the first cooling device 150 may direct the fluid 16 through the cooling tube 130 at comparatively high flow rates without risk that the selected flow rate would introduce substantial amounts of the fluid 16 into the draw furnace 110, disrupting operation of the draw furnace 110.

Figure 7:
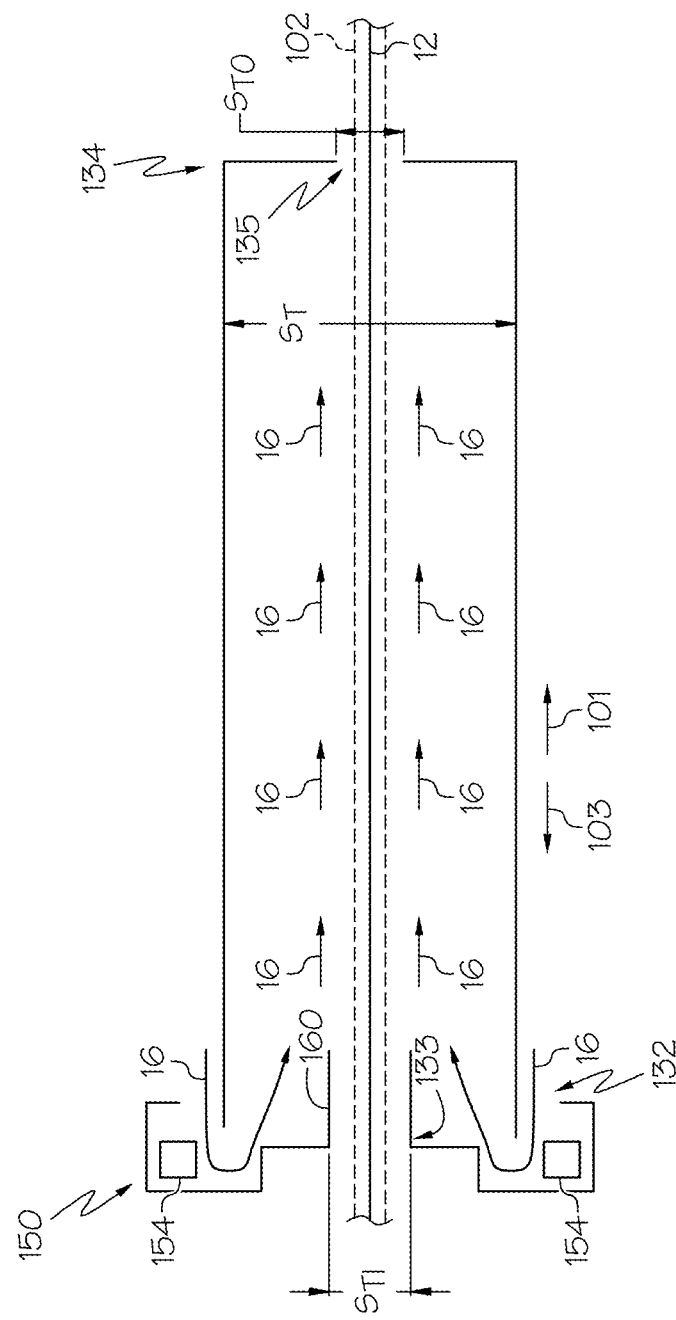
FIG. 7 schematically depicts a section view of another cooling tube, according to one or more embodiments shown and described herein.

Referring to FIG. 7, in some embodiments, the first cooling device 150 directs the fluid 16 in the fiber conveyance direction 101. For example in the embodiment depicted in FIG. 7, the first cooling device 150 is positioned at the upstream end 132 of the cooling tube 130 and directs the fluid 16 in the fiber conveyance direction 101. In the embodiment depicted in FIG. 7, the first cooling device 150 includes the pump 154 that moves the fluid 16 from the upstream end 132 to the downstream end 134 of the cooling tube 130. In some embodiments, the first cooling device 150 may draw the fluid 16 through the cooling tube 130 in the fiber conveyance direction 101.

Figure 8:
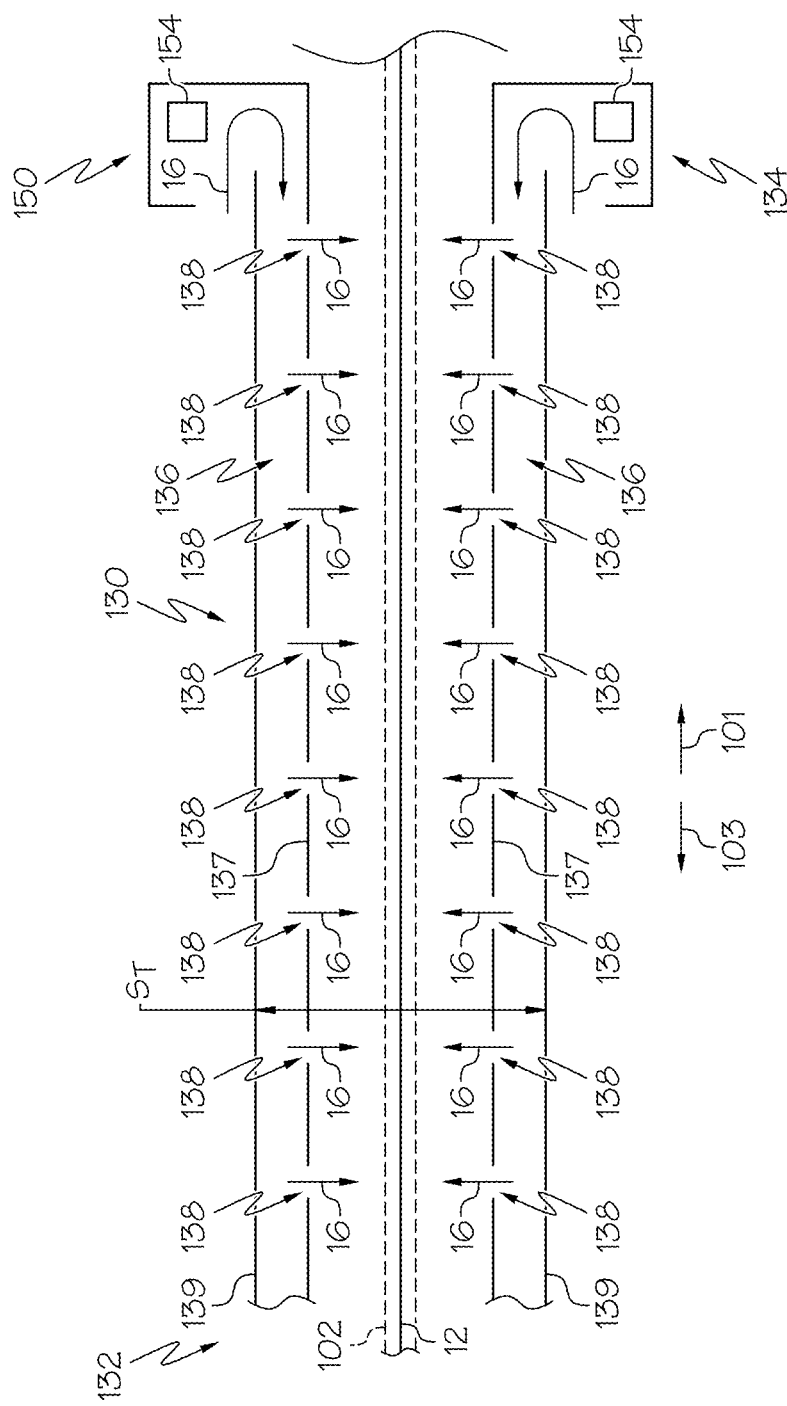
FIG. 8 schematically depicts a section view of another cooling tube, according to one or more embodiments shown and described herein.

Referring to FIG. 8, in some embodiments, the first cooling device 150 directs the fluid 16 against the optical fiber 12 in a direction that is transverse to the fiber conveyance direction 101. In particular, in the embodiment depicted in FIG. 8, the cooling tube 130 defines an annular channel 136 positioned between an outer wall 139 and an inner wall 137 positioned radially inward from the outer wall 139. The inner wall 137 defines a plurality of apertures 138 extending along a length of the cooling tube 130. The first cooling device 150 directs the fluid 16 through the annular channel 136 and through the plurality of apertures 138, such that the fluid 16 impinges the optical fiber 12 in a direction that is transverse to the fiber conveyance direction 101.

Figure 9:
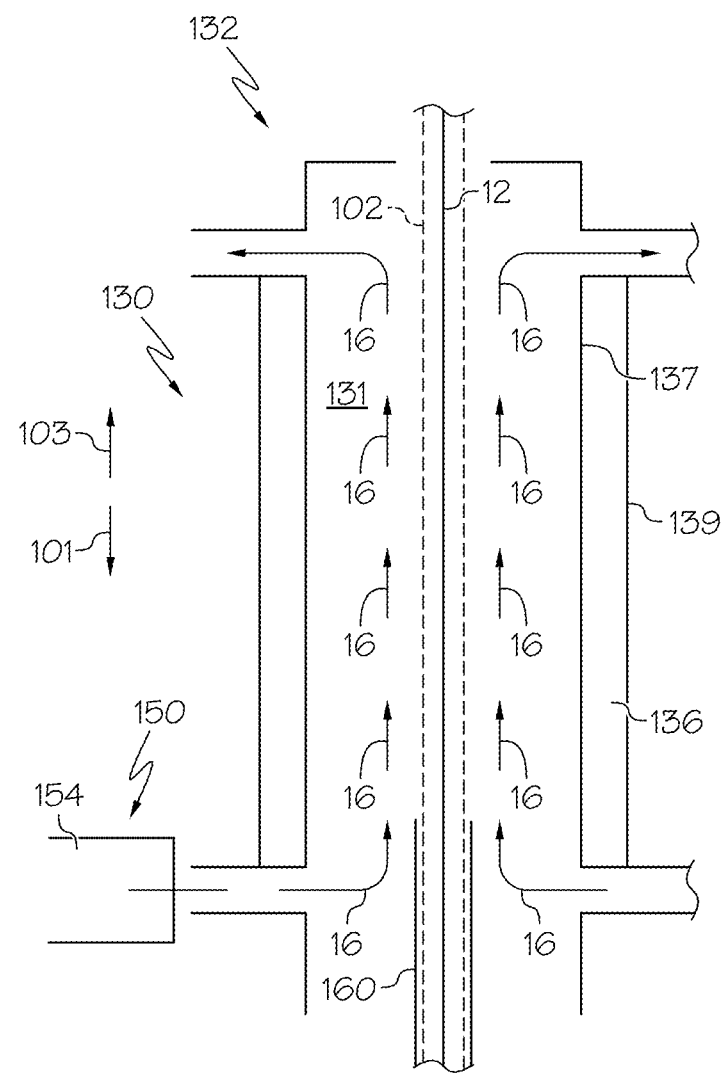
FIG. 9 schematically depicts a section view of another cooling tube, according to one or more embodiments shown and described herein.

Referring to FIG. 9, in some embodiments, the inner wall 137 and the outer wall 139 of the cooling tube 130 partially encapsulate the annular channel 136, such that the annular channel 136 is not in communication with an interior region 131 of the cooling tube 130. The interior region 131, in the embodiment depicted in FIG. 9, is bounded by the inner wall 137 of the cooling tube 130. The annular channel 136 is not in communication with the interior region 131 and forms a cooling jacket surrounding the interior region 131. In embodiments, a fluid, such as water or the like may be positioned within and/or passed through the annular channel 136. Fluid within the annular channel 136 may absorb thermal energy from the interior region 131 (e.g., from the fluid 16 and/or the optical fiber 12 within the interior region 131). While in the embodiment depicted in FIG. 9, the fluid 16 is being directed in the counter-conveyance direction 103, it should be understood that in other embodiments in which the cooling tube 130 includes the cooling jacket formed by the annular channel 136, the fluid 16 may be directed in the fiber conveyance direction 101, or may be directed against the optical fiber 12 in a direction that is transverse to the fiber conveyance direction 101.

Figure 2:
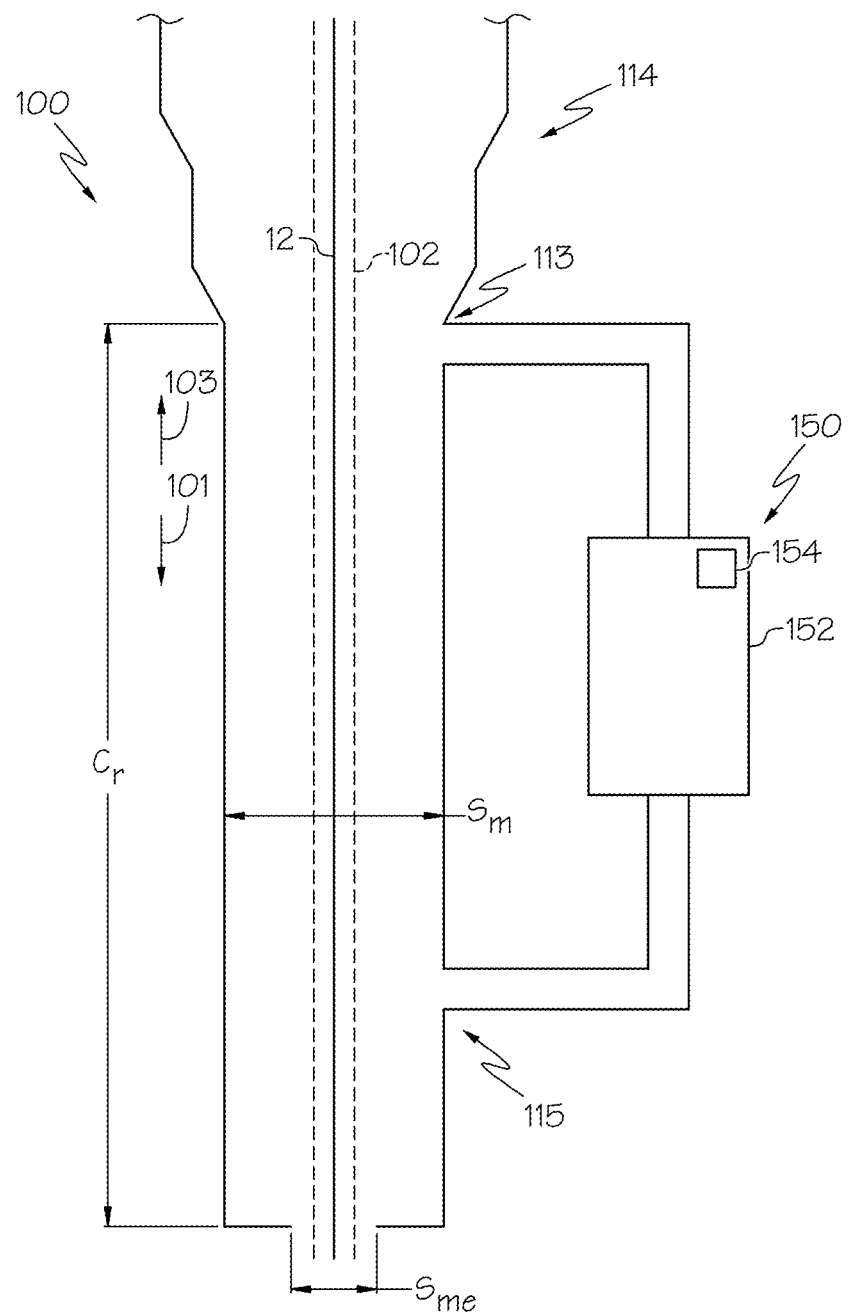
FIG. 2 schematically depicts a section view of a muffle of the optical fiber protection system of FIG. 1, according to one or more embodiments shown and described herein.

Accordingly, the first cooling device 150, whether in communication with the muffle 114 (as depicted in FIGS. 2 and 3) or in communication with the cooling tube 130 (as depicted in FIGS. 5-8), assists in cooling the optical fiber 12, which may assist in lowering the temperature of the optical fiber 12.

Figure 10:
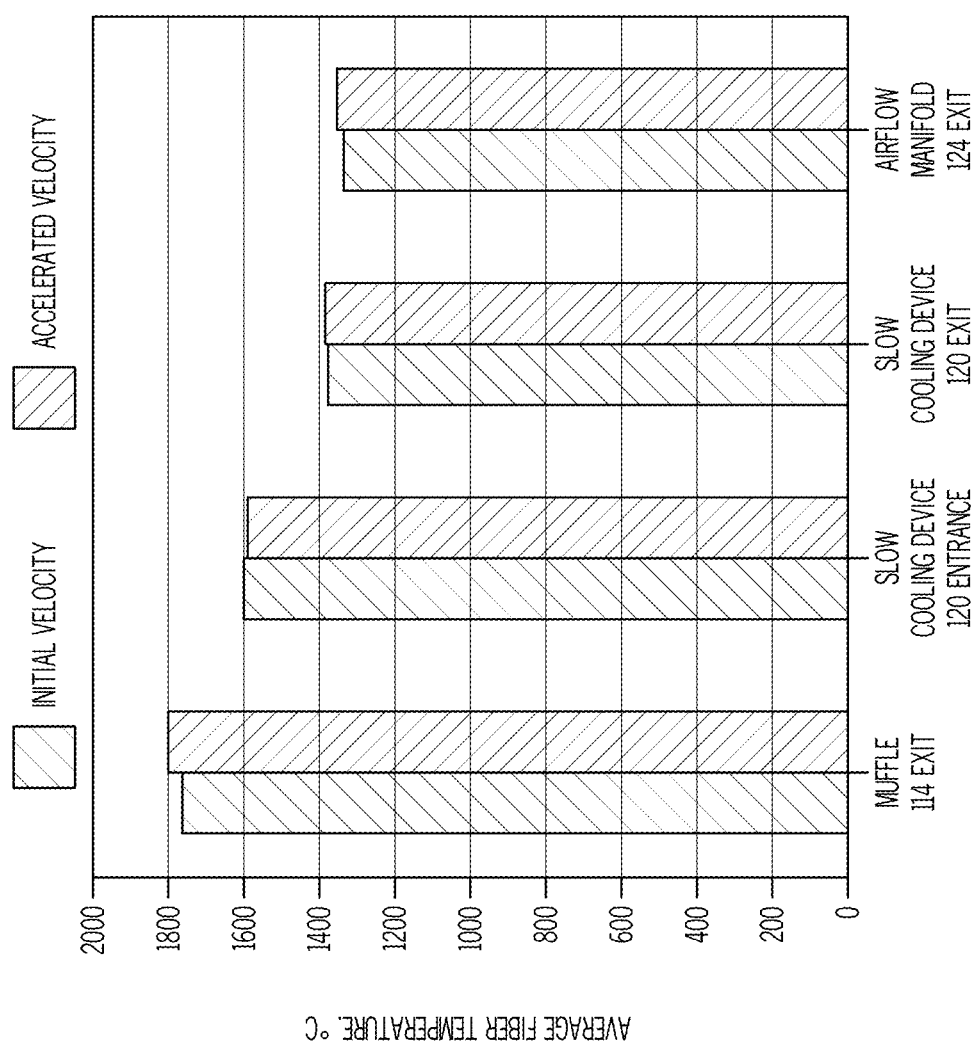
FIG. 10 is a chart showing example optical fiber temperatures at various locations of the optical fiber production system of FIG. 1, according to one or more embodiments shown and described herein.

For example and referring to FIGS. 1 and 10, the optical fiber production system 100 and example temperatures of the optical fiber 12 at selected positions of the optical fiber production system 100 are schematically depicted, respectively. As one example, the optical fiber 12 may be drawn through the optical fiber production system 100 at an initial velocity, which in the example depicted in FIG. 10 is about 50 meters per second (m/s). As the optical fiber 12 is drawn at the initial velocity, the optical fiber 12 may exit the muffle 114 at a temperature of about 1760 degrees Celsius (° C.). As the optical fiber 12 continues along the fiber conveyance pathway 102, the optical fiber 12 may be at about 1600° C. upon entering the second cooling device (slow cooling device) 120, and may exit the second cooling device 120 at about 1360° C. The optical fiber 12 may cool to about 1320° C. by the time the optical fiber 12 reaches the airflow manifold 124, further cooling before reaching the turning device 140.

Without being bound by theory, for silica-based fibers, the glass transition region generally extends between about 1200° C. and about 1700° C., inclusive of the endpoints. Below the glass transition region, relaxation of the glass or inducement of the glass toward a nearly equilibrium state may occur between about 1000° C. and 1200° C. At temperatures below 1000° C., the structure of the glass and/or state of the fiber is kinetically quenched and essentially invariant on practical time scales.

As the velocity of the optical fiber 12 moving along the fiber conveyance pathway 102 is increased, the temperature of the optical fiber 12 at the various locations along the fiber conveyance pathway 102 increases. More particularly, as the optical fiber 12 is drawn along the fiber conveyance pathway 102 at an accelerated velocity, the temperature of the optical fiber 12 may be generally higher than the temperature of the optical fiber 12 as compared to the temperature of the optical fiber 12 at the initial velocity. In the example depicted in FIG. 10, the accelerated velocity is about 60 m/s, and the depicted temperatures are indicative of example temperatures of the optical fiber 12 at selected locations of the optical fiber production system 100 without the benefit of the first cooling device 150.

As the optical fiber 12 exits the muffle 114, the optical fiber 12 may be at about 1795° C. At the second cooling device 120, the optical fiber 12 may be at about 1580° C., and the optical fiber 12 may be at about 1370° C. at the downstream end of the second cooling device 120. As the optical fiber 12 exits the airflow manifold 124, the optical fiber 12 may be at about 1330° C. Accordingly, as the velocity at which the optical fiber 12 is drawn along the fiber conveyance pathway 102 increases, the temperature at which the optical fiber 12 enters the airflow manifold 124 and the second cooling device 120 generally increases.

Accordingly, without the benefit of the first cooling device 150, the temperature of the optical fiber 12 increases and the cooling time of the fiber in the second cooling device 120 decreases when the optical fiber 12 is drawn at an accelerated velocity. The fictive temperature of the optical fiber may increase and attenuation of the optical fiber may be higher when drawing the optical fiber at an accelerated velocity. Additionally and as noted above, the optical fiber production system 100 may be positioned within a draw tower having a fixed height TH, and accordingly it may be impractical to increase the height of the optical fiber production system 100 to allow further time for cooling of the optical fiber 12. However, by moving the fluid 16 (FIGS. 2-8) against the optical fiber 12, the temperature of the optical fiber 12 is reduced and the optical fiber 12 may be drawn at the accelerated velocity while maintaining a low fictive temperature, thereby allowing for increased optical fiber production without compromising attenuation.

While reference is made herein to the accelerated velocity being 60 m/s, it should be understood that the optical fiber 12 may be conveyed at other velocities. For example, in embodiments, the optical fiber 12 may be conveyed at 30 m/s, 35 m/s, 40 m/s, 45 m/s, 50 m/s, 55 m/s, 60 m/s, 65 m/s, 70 m/s, 75 m/s, 80 m/s, or 85 m/s.

While FIG. 10 depicts an embodiment in which the optical fiber 12 has a temperature of 1580° C. at the second cooling device 150, it should be understood that this is merely an example. In embodiments the optical fiber 12 has a first temperature at the first inlet (e.g., the upstream portion 113 of the muffle 114 (FIG. 2) or the cooling tube inlet 133 (FIG. 6)) of the first cooling device 150, and a second temperature at the first outlet (e.g., the downstream portion 115 of the muffle 114 (FIG. 2) or the cooling tube outlet 135 (FIG. 6)) of the first cooling device 150. In embodiments, the optical fiber 12 has a third temperature at the second inlet 126 of the second cooling device 120, and a fourth temperature at the second outlet 128 of the second cooling device 120.

In some embodiments, the third temperature is greater than 1200° C. In some embodiments, the third temperature is greater than 1300° C. In some embodiments, the third temperature is greater than 1400° C.

In embodiments, the first cooling device 150 (FIGS. 2, 3, 5-9) and the second cooling device 120 cool the optical fiber 12 at different rates to achieve desired temperatures of the optical fiber at different points along the optical fiber production system 100. In embodiments, the first cooling device 150 (FIGS. 2, 3, 5-9) cools the optical fiber 12 at a rate greater than the second cooling device 120. In some embodiments, the first cooling device 150 (FIGS. 2, 3, 5-9) cools the optical fiber at a rate of at least 10000 degrees Celsius per second (° C./s). In some embodiments, the first cooling device 150 (FIGS. 2, 3, 5-9) cools the optical fiber 12 the optical fiber 12 is cooled at a rate greater than 15000° C./s. In some embodiments, the first cooling device 150 (FIGS. 2, 3, 5-9) cools the optical fiber 12 the optical fiber 12 at a rate greater than 20000° C./s. In some embodiments, the optical fiber 12 is cooled at a rate greater than 25000° C./s, 30000° C./s, 35000° C./s, 40000° C./s, 45000° C./s, or greater than 50000° C./s in the first cooling device 150 (FIGS. 2, 3, 5-9). In some embodiments, the first cooling device 150 (FIGS. 2, 3, 5-9) cools the optical fiber 12 at a rate between 10000° C./s and 45000° C./s, inclusive of the endpoints. In some embodiments, the first cooling device 150 (FIGS. 2, 3, 5-9) cools the optical fiber 12 at a rate between 15000° C./s and 45000° C./s, inclusive of the endpoints. In some embodiments, the first cooling device 150 (FIGS. 2, 3, 5-9) cools the optical fiber 12 at a rate between 20000° C./s and 45000° C./s, inclusive of the endpoints.

In some embodiments, the second cooling device 120 cools the optical fiber 12 at a rate less than 5000° C./s. In some embodiments, the second cooling device 120 cools the optical fiber 12 at a rate less than 4000° C./s. In some embodiments, the second cooling device 120 cools the optical fiber 12 at a rate greater than 2000° C./s.

As referred to herein, the cooling rates of the optical fiber can be expressed as a function of the temperature of the optical fiber 12 at the inlets and outlets of the first cooling device 150 (FIGS. 2, 3, 5-9) and the inlets and outlets of the second cooling device 120 divided by the residence time of the optical fiber 12 within the first cooling device 150 (FIGS. 2, 3, 5-9) and the second cooling device 120, respectively. For example, the cooling rate of the first cooling device 150 (FIGS. 2, 3, 5-9) can be defined as the difference between the first temperature of the optical fiber 12 at the first inlet of the first cooling device 150 and the second temperature of the optical fiber 12 at the first outlet of the first cooling device 150, divided by the amount of time it takes for a portion of the optical fiber 12 to travel from the first inlet to the first outlet (e.g., the length of the first cooling device 150 divided by the velocity of the optical fiber 12 at the first cooling device 150). Similarly, the cooling rate of the second cooling device 120 can be defined as the difference between the third temperature of the optical fiber 12 at the second inlet of the second cooling device 120 and the fourth temperature of the optical fiber 12 at the second outlet of the second cooling device 120, divided by the amount of time it takes a portion of the optical fiber 12 to travel from the second inlet to the second outlet (e.g., the length of the second cooling device 120 divided by the velocity of the optical fiber 12 at the second cooling device 120).

In embodiments, the first cooling device 150 assists in changing a fiber formation point FFP of the optical fiber 12. For example and referring to FIG. 1, as the optical fiber 12 is drawn along the fiber conveyance pathway 102, a diameter of the optical fiber 12 generally decreases until the optical fiber 12 reaches a finished diameter at a fiber formation point FFP. Below (downstream of) the fiber formation point FFP, the diameter of the optical fiber 12 may have minimal change. As the optical fiber 12 initially exits the draw furnace 110 and the muffle 114, the optical fiber 12 may plastically deform, with the diameter of the optical fiber 12 decreasing until the optical fiber 12 cools sufficiently such that the dimensional properties of the optical fiber 12 are fixed. More particularly, the diameter of the optical fiber 12 generally decreases until the optical fiber 12 reaches the finished diameter at the fiber formation point FFP. In some embodiments, the finished diameter of the optical fiber 12 is about 0.125 millimeters.

At the fiber formation point FFP, the optical fiber 12 is generally at a forming point temperature Tfp. The forming point temperature Tfp is a temperature of the optical fiber 12 at which a viscosity of the cladding 11 (FIG. 4) of the optical fiber 12 is such that the diameter of the optical fiber 12 does not generally change as the fiber is cooled. In embodiments, the viscosity of the cladding 11 (FIG. 4) at the forming point temperature Tfp is about $10^{8.2}$ Poise. In some embodiments, the viscosity of the cladding 11 (FIG. 4) at the forming point temperature Tfp is between $10^{8.20}$ Poise and $10^{8.30}$ Poise, inclusive of the endpoints. In some embodiments, the viscosity of the cladding 11 (FIG. 4) at the forming point temperature Tfp is between $10^{8.23}$ Poise and $10^{8.24}$ Poise, inclusive of the endpoints. Different optical fibers 12 (e.g. optical fibers differing in composition or dopant concentration) may have different forming point temperatures Tfp (i.e., different temperatures at which the viscosity of the cladding 11 is at about $10^{8.2}$ Poise). For example, for some optical fiber compositions, the forming point temperature Tfp is about 1550° C. For some optical fiber compositions, the forming point temperature Tfp is about 1620° C. In embodiments, as the optical fiber 12 moves through the second cooling device 120, the viscosity of the cladding 11 (FIG. 4) of the optical fiber 12 may change. For example, in some embodiments, the cladding 11 (FIG. 4) of the optical fiber 12 has a viscosity between $10^{8.2}$ Poise and $10^{10.7}$ Poise at the second outlet 128 of the second cooling device 120.

In some embodiments, the first temperature of the optical fiber 12 at the first inlet (e.g., the upstream portion 113 (FIG. 2) or the cooling tube inlet 133 (FIG. 6)) of the first cooling device 150 is more than 150° C. greater than the forming point temperature Tfp. In some embodiments, the first temperature of the optical fiber 12 at the first inlet is characterized by the following equation in which T1 is the first temperature and Tfp is the forming point temperature:

$$Tfp+150°\ C.<T1<Tfp+500°\ C.$$

In embodiments, the second temperature of the optical fiber 12 at the first outlet (e.g., the downstream portion 115 of the muffle 114 (FIG. 2) or the cooling tube outlet 135 (FIG. 6)) of the first cooling device 150 can also be expressed with relation to the forming point temperature Tfp. In some embodiments, the second temperature of the optical fiber 12 at the first outlet is characterized by the following equation in which T2 is the second temperature and Tfp is the forming point temperature:

$$Tfp100°\ C.<T2$$

In some embodiments, the second temperature of the optical fiber 12 at the first outlet is characterized by the following equation in which T2 is the second temperature and Tfp is the forming point temperature:

$$Tfp100°\ C.<T2<Tfp+200°\ C.$$

While the diameter of the optical fiber 12 is generally constant downstream of the fiber formation point FFP, in some embodiments, the diameter of the optical fiber 12 changes as the optical fiber 12 moves through the first cooling device 150 and the second cooling device 120. For example, in some embodiments the optical fiber 12 has a first diameter at the first inlet (e.g., the upstream portion 113 of the muffle 114 (FIG. 2) or the cooling tube inlet 133 (FIG. 6)) of the first cooling device 150 (FIGS. 2, 3, 5-9), and a second diameter at the first outlet (e.g., the downstream portion 115 of the muffle 114 (FIG. 2) or the cooling tube outlet 135 (FIG. 6)) of the first cooling device 150. In embodiments, the optical fiber 12 has a third diameter at the second inlet 126 of the second cooling device 120, and a fourth diameter at the second outlet 128 of the second cooling device 120. Between the first inlet of the first cooling device 150 (FIGS. 2, 3, 5-9) and the second outlet of the second cooling device 120, the optical fiber 12 can have a diameter in a range between 80 micrometers and 130 micrometers, inclusive of the endpoints.

In embodiments, the second cooling device 120 is generally positioned below the fiber formation point FFP (FIG. 1), and accordingly, the diameter of the optical fiber 12 may experience minimal change in the second cooling device 120 (FIG. 1). In embodiments, the fourth diameter of the optical fiber 12 at the second outlet 128 exceeds 90% of the third diameter of the optical fiber 12 at the second inlet 126. In some embodiments, the fourth diameter of the optical fiber 12 at the second outlet 128 exceeds 95% of the third diameter of the optical fiber 12 at the second inlet 126. In some embodiments, the fourth diameter of the optical fiber 12 at the second outlet 128 is in a range from 90% of the third diameter to 100% of the third diameter of the optical fiber 12 at the second inlet 126. In some embodiments, the fourth diameter of the optical fiber 12 at the second outlet 128 is in a range from 95% of the third diameter to 100% of the third diameter of the optical fiber 12 at the second inlet 126. In some embodiments, the fourth diameter of the optical fiber 12 at the second outlet 128 is in a range from 97% of the third diameter to 100% of the third diameter of the optical fiber 12 at the second inlet 126. In some embodiments, the fourth diameter of the optical fiber 12 at the second outlet 128 is in a range from 98% of the third diameter to 100% of the third diameter of the optical fiber 12 at the second inlet 126. In some embodiments, the fourth diameter of the optical fiber 12 at the second outlet 128 is in the range from 99% of the third diameter of to 100% of the third diameter third diameter of the optical fiber 12 at the second inlet 126. In some embodiments, the third diameter of the optical fiber 12 at the second inlet 126 is greater than 80 micrometers. In some embodiments, the third diameter of the optical fiber 12 at the second inlet 126 is greater than 100 micrometers. In some embodiments, the third diameter of the optical fiber 12 at the second inlet 126 is greater than 120 micrometers. In some embodiments, the third diameter of the optical fiber 12 at the second inlet 126 is in a range from 120 micrometers to 130 micrometers, inclusive of the endpoints. In some embodiments, the third diameter of the optical fiber 12 at the second inlet 126 is about 126.3 micrometers.

In embodiments, the first cooling device 150, whether in communication with the muffle 114 (as depicted in FIGS. 2 and 3) or in communication with the cooling tube 130 (as depicted in FIGS. 5-8), is positioned upstream of the fiber formation point FFP. By cooling the optical fiber 12 above the fiber formation point FFP, the first cooling device 150 assists in cooling the optical fiber 12 such that the optical fiber 12 reaches the finished diameter further upstream as compared to optical fiber production systems that do not include a first cooling device. In some instances, it is desirable for the optical fiber 12 to reach the finished diameter at or upstream of second inlet 126 of the second cooling device 120. Accordingly, by cooling the optical fiber 12 such that the fiber formation point FFP moves upstream, the second cooling device 120 may be moved upstream, allowing for a longer length of the second cooling device 120, allowing further residence time of the optical fiber 12 in the second cooling device 120.

In embodiments, the optical fiber decreases in diameter between first inlet (e.g., the upstream portion 113 of the muffle 114 (FIG. 2) or the cooling tube inlet 133 (FIG. 6)) and/or the first outlet (e.g., the downstream portion 115 of the muffle 114 (FIG. 2) or the cooling tube outlet 135 (FIG. 6)) of the first cooling device 150 and the second outlet 128 (FIG. 1) of the second cooling device 120 (FIG. 1). For example, in some embodiments, the first diameter of the optical fiber 12 at the first inlet of the first cooling device 150 (FIGS. 2, 3, 5-9) is in a range from 102% and 150% of the fourth diameter of the optical fiber 12 at the second outlet 128 of the second cooling device 120. In some embodiments, the second diameter of the optical fiber 12 at the first outlet of the first cooling device 150 (FIGS. 2, 3, 5-9) is in a range between 100% and 125% of the fourth diameter of the optical fiber 12 at the second outlet 128 of the second cooling device 120. In some embodiments, the second diameter of the optical fiber 12 at the first outlet of the first cooling device 150 (FIGS. 2, 3, 5-9) is in a range between 100% and 101% of the fourth diameter of the optical fiber 12 at the second outlet 128 of the second cooling device 120. In some embodiments, the first diameter the first diameter of the optical fiber 12 at the first inlet of the first cooling device 150 (FIGS. 2, 3, 5-9) is about 160 micrometers. In some embodiments, the second diameter of the optical fiber 12 at the first outlet of the first cooling device 150 (FIGS. 2, 3, 5-9) is about 131 micrometers.

In view of the foregoing description, it should be understood that embodiments are directed to systems and methods for cooling an optical fiber in an optical fiber production process. In particular, embodiments described herein are directed to optical fiber production systems including a draw furnace, a second cooling device, a turning device, and a first cooling device positioned upstream of the second cooling device. The first cooling device directs fluid against the optical fiber to cool the optical fiber before the optical fiber enters the second cooling device. In some embodiments, the fluid acts to reduce a gas boundary layer of the optical fiber to facilitate cooling of the optical fiber. In embodiments, the first cooling device also cools the optical fiber above the forming point (that is, when the temperature of the optical fiber is above the forming point temperature Tfp), such that the forming point maybe moved upward along the optical fiber draw tower, allowing more space along optical fiber draw tower for additional cooling below the forming point. Additional cooling of the optical fiber below the forming point can improve fiber optical attenuation.

Figure 11:
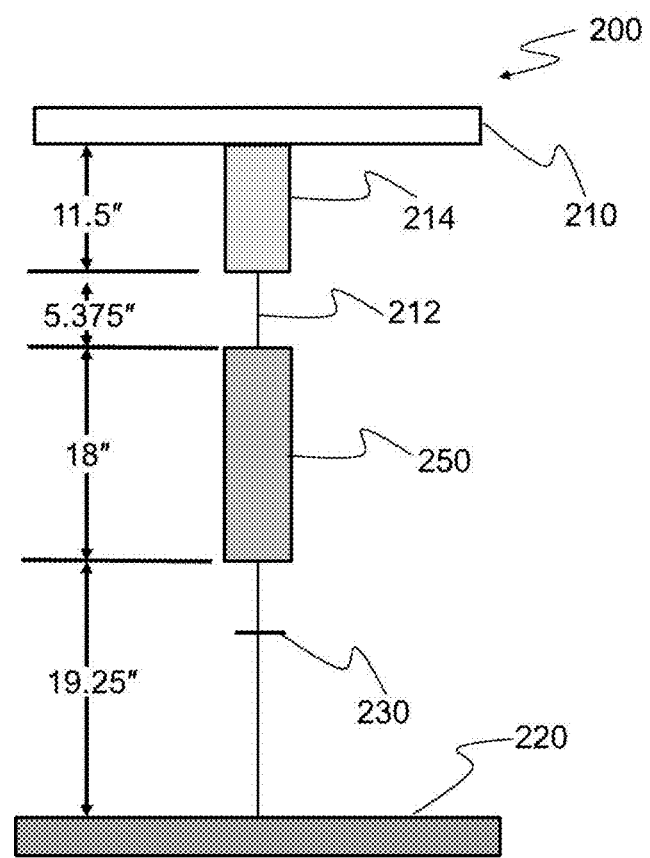
FIG. 11 depicts a portion of an optical fiber production system with two cooling devices.
Figure 12:
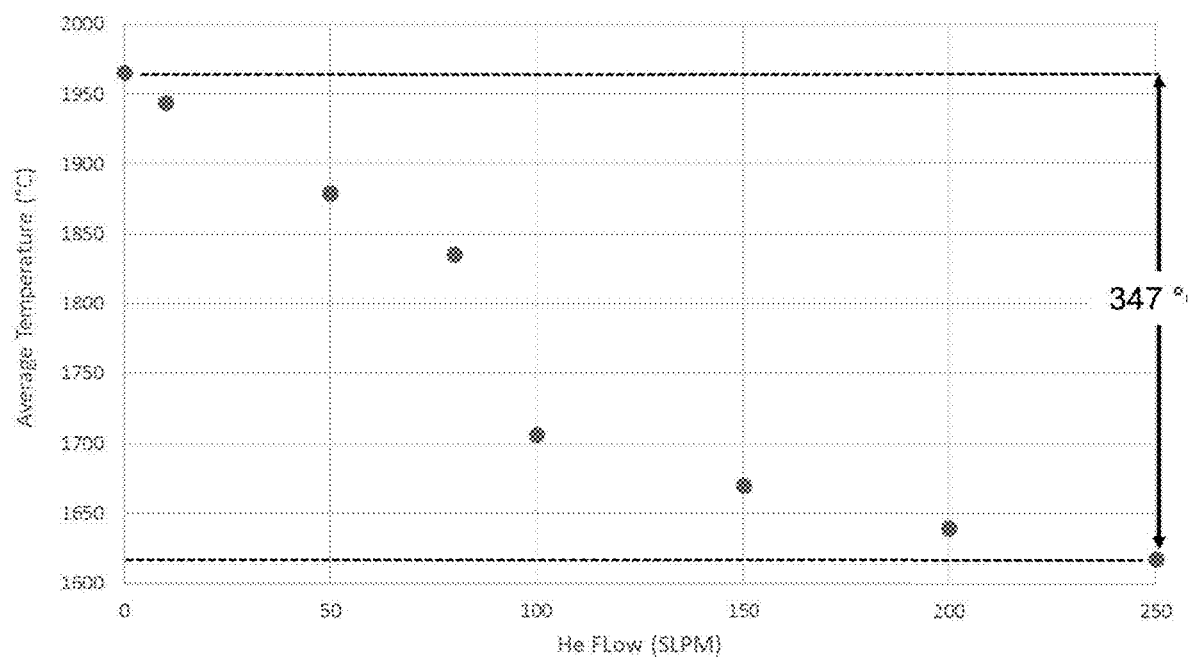
FIG. 12 shows the variation in the average temperature of an optical fiber with flow rate of He gas.

FIGS. 11 and 12 illustrate a representative effect of a cooling tube on the temperature of an optical fiber. FIG. 11 depicts a portion of an optical fiber production system 200 similar to the one depicted in FIG. 5. The depicted portion of optical fiber production system 200 includes an exit from a draw furnace 210, a muffle 214, a first cooling device 250, a pyrometer 230, and an entrance to a second cooling device 220. Spacing and distances between the process units are as indicated. Pyrometer 230 was positioned about five inches below the exit of first cooling device 250. Optical fiber 212 was drawn from a preform (not shown) located in draw furnace 210, passed through muffle 214 and first cooling device 250, and was directed to the entrance of second cooling device 220. The draw speed of optical fiber 212 was 60 m/s. First cooling device 250 included a cooling tube having an inside diameter of 0.5 inch and a water jacket. Helium gas was flowed through the cooling tube in a direction counter to the direction of draw of optical fiber 212. Various flow rates of He gas were utilized and the temperature of optical fiber 212 was determined by pyrometer 230. FIG. 12 shows the variation in the average temperature of optical fiber 212 with flow rate of He gas (reported in standard liters per minute (SLPM)) as determined by pyrometer 230. When no He gas was flowed, the average fiber temperature was over 1950° C. The average fiber temperature progressively decreases as the He flow rate was increased. A decrease of almost 350° C. was observed for a flow rate of He of 250 SLPM. The results demonstrate the ability of a cooling tube to control the temperature of the optical fiber. By adjusting the conditions of the cooling tube (e.g. length, inside diameter, He flow rate, etc.), the temperature of the optical fiber at the entrance of the second cooling device can be controlled as desired to optimize cooling of the optical fiber and improve characteristics (e.g. attenuation, Rayleigh scattering) that depend on the cooling conditions of the optical fiber.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for processing optical fiber, the method comprising:
conveying an optical fiber through a first cooling device, the first cooling device having a first inlet and a first outlet positioned opposite the first inlet, the optical fiber entering the first cooling device at the first inlet and exiting the first cooling device at the first outlet, the optical fiber having a first temperature and a first diameter at the first inlet, and a second temperature and a second diameter at the first outlet;
cooling the optical fiber at a rate greater than 10000° C./s in the first cooling device;
conveying the optical fiber from the first cooling device to and through a second cooling device at a velocity greater than 40 m/s, the second cooling device having a second inlet and a second outlet, the optical fiber entering the second cooling device at the second inlet and exiting the second cooling device at the second outlet, the optical fiber having a third temperature and a third diameter at the second inlet and a fourth temperature and a fourth diameter at the second outlet, the third temperature being greater than 1100° C. the fourth diameter exceeding 95% of the third diameter, and the first diameter being between 102% and 150% of the fourth diameter; and
cooling the optical fiber at a rate less than 5000° C./s in the second cooling device wherein at the first inlet:
the optical fiber has a forming point temperature Tfp;
the first temperature is T1; and $$Tfp+150° C.<T1 Tfp+500° C.$$

2. The method of claim 1, wherein the optical fiber is conveyed from the first cooling device to and through the second cooling device at a velocity greater than 50 m/s.

3. The method of claim 1, wherein at the first outlet:
the second temperature is T2;
the optical fiber has a forming point temperature Tfp; and $$Tfp-100° C.<T2.$$

4. The method of claim 1, wherein at the first outlet:
the second temperature is T2;
the optical fiber has a forming point temperature Tfp; and $$Tfp-100° C.<T2<Tfp+200° C.$$

5. The method of claim 1, wherein the second diameter is between 100% and 125% of the fourth diameter.

6. The method of claim 1, wherein the second diameter is between 100% and 105% of the fourth diameter.

7. The method of claim 1, wherein the third diameter is between 100% and 101% of the fourth diameter.

8. The method of claim 1, wherein the third diameter is greater than 80 micrometers.

9. The method of claim 1, wherein the third diameter is in a range from 120 micrometers to 130 micrometers.

10. The method of claim 1, wherein the optical fiber is cooled at a rate greater than 15000° C./s in the first cooling device.

11. The method of claim 1, wherein the optical fiber is cooled at a rate between 20000° C./s and 45000° C./s in the first cooling device.

12. The method of claim 1, wherein the third temperature is greater than 1200° C.

13. The method of claim 1, wherein the fourth diameter is greater than 98% of the third diameter.

14. The method of claim 1, wherein the optical fiber comprises a core and a cladding extending around the core, the cladding having a viscosity greater than $10^{8.2}$ Poise at the second inlet.

15. The method of claim 1, wherein the optical fiber is cooled at a rate less than 4000° C./s in the second cooling device.

16. The method of claim 1, wherein the optical fiber is cooled at a rate greater than 2000° C./s and less than 5000° C./s in the second cooling device.

\* \* \* \* \*

UNITED STATES PATENT AND TRADEMARK OFFICE
CERTIFICATE OF CORRECTION

PATENT NO. : 11,554,979 B2
APPLICATION NO. : 17/111168
DATED : January 17, 2023
INVENTOR(S) : Steven Akin Dunwoody et al.

Page 1 of 1

It is certified that error appears in the above-identified patent and that said Letters Patent is hereby corrected as shown below:

In the Claims

In Column 20, Line 20, in Claim 1, delete "1100° C." and insert -- 1100° C., --.

In Column 20, Line 29, in Claim 1, delete "Tfp+150° C.<T1Tfp+500° C." and insert -- Tfp+150° C.<T1<Tfp+500° C. --.

Signed and Sealed this
Twenty-fifth Day of July, 2023

Katherine Kelly Vidal
*Director of the United States Patent and Trademark Office*